United States Patent [19]

Suzuki et al.

[11] Patent Number: 4,809,427

[45] Date of Patent: Mar. 7, 1989

[54] METHOD FOR ASSEMBLING A MAGNETIC HEAD SUPPORTING MECHANISM OF A FLEXIBLE DISK DRIVE APPARATUS

[75] Inventors: Tsuneo Suzuki, Yokohama; Chikahisa Kawakami, Oume; Hiroshi Ohashi, Higashiyamato, all of Japan

[73] Assignee: Kabushiki Kaisha Toshiba, Kawasaki, Japan

[21] Appl. No.: 32,441

[22] Filed: Mar. 31, 1987

[30] Foreign Application Priority Data

Mar. 31, 1986 [JP] Japan .................................. 61-70739

[51] Int. Cl.$^4$ ................................................ G11B 5/42
[52] U.S. Cl. ........................................ 29/603; 29/467
[58] Field of Search .................. 29/603, 467; 360/103, 360/104; 156/556

[56] References Cited

U.S. PATENT DOCUMENTS 4,509,251  4/1985  Gyi et al. ................................ 29/603
4,520,555  6/1985  Gyi et al. ................................ 29/603

Primary Examiner—Carl E. Hall
Attorney, Agent, or Firm—Cushman, Darby & Cushman

[57] ABSTRACT

A method for assembling a magnetic head supporting mechanism of a flexible disk drive apparatus comprising the steps of attaching to a gimbal support device a magnetic head for recording and reproducing information by contacting a recording surface of a disk, by a first gimbal device for slidably supporting the magnetic head, the gimbal support device receiving a force when the position of the magnetic head is adjusted, placing the first gimbal device in a position opposite the disk of a head support device, applying the force to the gimbal support device to position the magnetic head in a predetermined position separated by a predetermined distance from a reference position of the head support device, and moving the gimbal support device in the position opposite the disk of the head support device, and attaching the gimbal support device to the head support device.

9 Claims, 4 Drawing Sheets

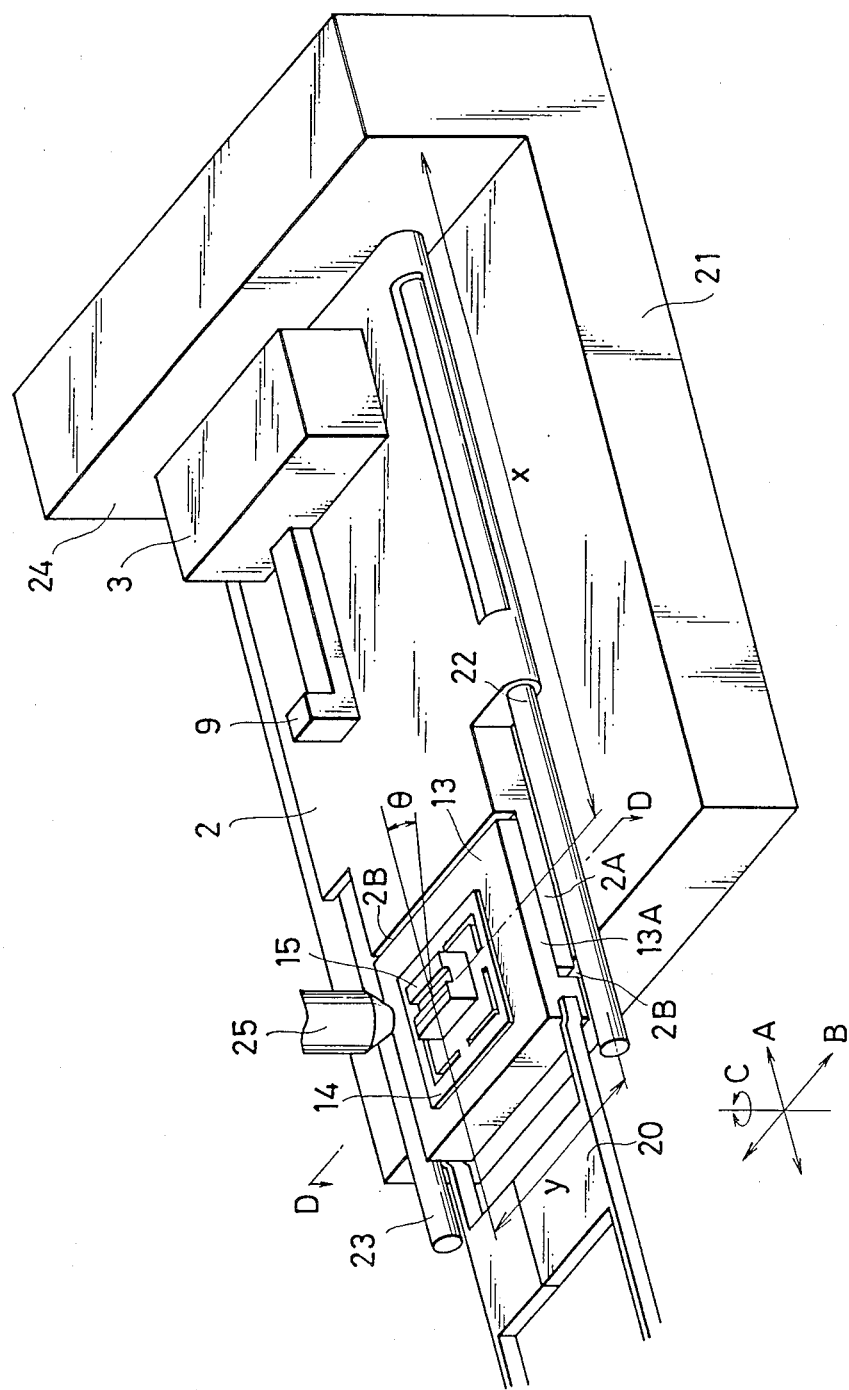

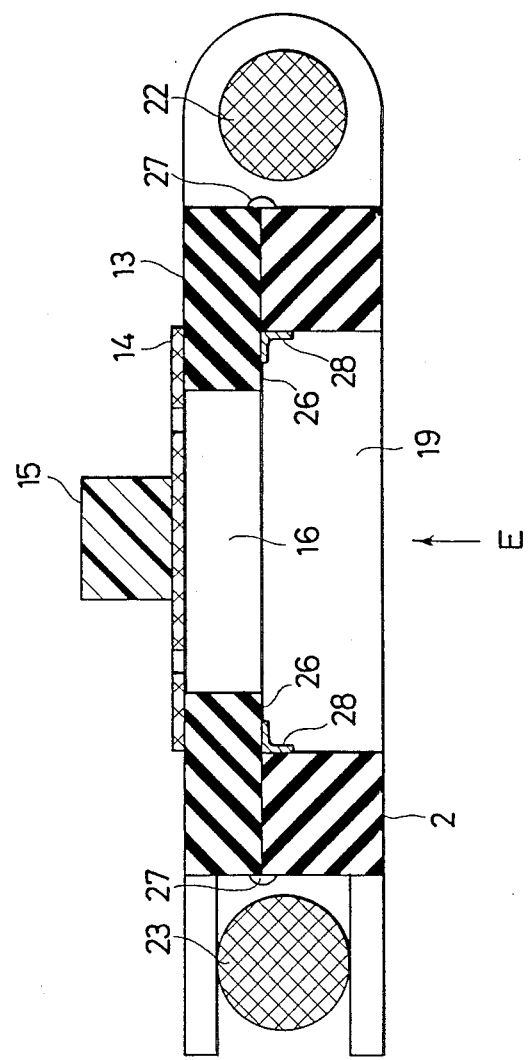

METHOD FOR ASSEMBLING A MAGNETIC HEAD SUPPORTING MECHANISM OF A FLEXIBLE DISK DRIVE APPARATUS

BACKGROUND OF THE INVENTION

The present invention relates to a method for assembling a magnetic head supporting mechanism of a flexible disk drive apparatus for recording information in a flexible magnetic recording disk and reproducing the information from the magnetic recording disk.

PRIOR ART

In a conventional flexible disk drive apparatus in which information is recorded and reproduced by contacting and sliding magnetic heads on both surfaces of a flexible magnetic disk, a one-side opening type is used in which only one of two support members for supporting the magnetic heads is operated in a direction generally perpendicular to the surfaces of the disk at the times of loading and unloading, thereby making the apparatus compact and thin. A carriage assembly in the apparatus of such a one-side opening type is divided into two types by the construction thereof. The first type of the carriage assembly is of a type that a first magnetic head is directly attached to a carriage which is a member for moving a head. The second type of the carriage asembly is of a type that the first magnetic head is attached to the carriage through a gimbal plate.

Recently, there has been used the second type of the carriage assembly in which the first magnetic head is attached to the carriage through the gimbal plate so as to follow the first magnetic head according to the change in movement of the disk, thereby improving the durability of the disk. The second type of the carriage assembly is constructed as follows.

A first magnetic head is arranged to oppose one of the surfaces of a flexible magnetic disk. The first magnetic head is attached through a first gimbal plate to one end of a carriage which is a member for moving the head in the radial direction of the disk by a stepping motor. This carriage is not actuated in a direction perpendicular to the surfaces of the disk. A second magnetic head is arranged to oppose the other surface of the disk. The second magnetic head is attached through a second gimbal plate to one end of a head arm which is a head support member actuated in a direction generally perpendicular to the surfaces of the disk at the times of loading and unloading. The other end of the head arm is attached to the other end of the carriage through a leaf spring.

The carriage assembly of this type is assembled by the following method.

Firstly, the first magnetic head is attached to the first gimbal plate. Secondly, the gimbal plate is attached to the carriage while holding the first magnetic head attached onto the first gimbal plate by means of a jig, etc for adjusting the head. At this time, an operator moves the jig in which the first magnetic head is held using a microscope, etc. The operator then adjusts the position of the first magnetic head with respect to the carriage and thereafter attaches the gimbal plate to the carriage. Next, the second magnetic head is attached to the second gimbal plate, and the second gimbal plate is attached to the head arm while holding the second magnetic head attached onto the second gimbal plate by a jig, etc. Next, the positions of the first and second magnetic heads are adjusted with respect to each other while moving the entire head arm, and thereafter the head arm is attached to the carriage.

In such a conventional apparatus, the rigidity of the first gimbal plate for attaching the first magnetic head thereto is relatively great. Accordingly, when the positions of the carriage and the first magnetic head are adjusted with respect to each other while holding the first magnetic head by a jig, there is no error of attachment thereof.

However, the rigidity of the first gimbal plate to which the first magnetic head is attached has been recently small to improve the durability of the disk by following the first magnetic head better with respect to the change in movement of the disk. When the rigidity of the first gimbal plate is small, the first gimbal plate is greatly deformed due to an external force applied thereto when the first magnetic head is held by a jig. In such a deformed state of the first gimbal plate, even when the positions of the carriage and the first magnetic head are exactly adjusted with respect to each other while holding the first magnetic head by a jig, after the jig is separated from the first magnetic head, the first magnetic head is located in a place displaced from a predetermined place set when the first magnetic head is supported by the jig, thereby generating an error of attachment between the carriage and the first magnetic head.

When there is an error in the attachment of the first magnetic head to the carriage, the accuracy of the apparatus is reduced and, accordingly, it is difficult to increase the recording density of the apparatus.

SUMMARY OF THE INVENTION

To overcome the problems mentioned above, an object of the present invention is to provide a method for assembling a magnetic head supporting mechanism of a flexible disk drive apparatus in which the positioning accuracy of a magnetic head with respect to a member for moving the magnetic head is improved.

With the above object in view, the present invention resides in a method for assembling a magnetic head supporting mechanism of a flexible disk drive apparatus comprising the steps of attaching to a gimbal support means a magnetic head means for recording and reproducing information by contacting a recording surface of a disk, by a first gimbal means for slidably supporting the magnetic head means, said gimbal support means receiving a force when the position of said magnetic head means is adjusted, placing said first gimbal means in a position opposite said disk of a head support means, applying said force to said gimbal support means to position said magnetic head means in a predetermined position separated by a predetermined distance from a reference position of said head support means, and moving said gimbal support means in said position opposite said disk of said head support means, and attaching said gimbal support means to said head support means.

According to the above method, a stress is not applied to a magnetic head means since the position of the magnetic head means is adjusted by moving the gimbal support means. Therefore, the magnetic head means is accurately attached with respect to the head support means, thereby improving the recording density of the apparatus.

BRIEF DESCRIPTION OF THE DRAWINGS

The present invention will be more apparent from the preferred embodiments thereof in conjunction with the accompanying drawings in which:

FIG. 3 is a view for explaining how the position of the magnetic head is adjusted in the embodiment of FIG. 1; and FIG. 4 is a sectional view taken along Line D—D of FIG. 3.

DETAILED DESCRIPTION OF THE PREFERRRED EMBODIMENTS

The preferred embodiments of a magnetic head supporting mechanism according to the present invention will be described with reference to the drawings.

Figure 1:
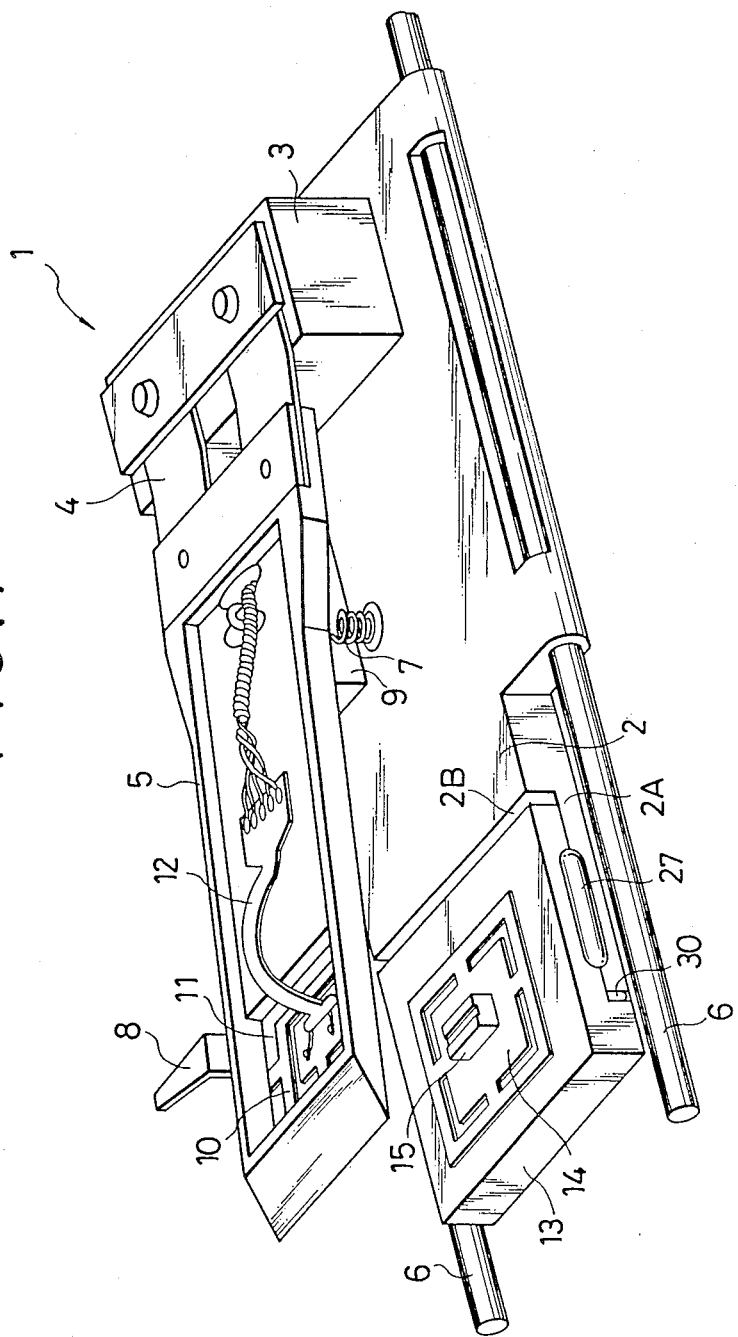
FIG. 1 is a perspective view showing one embodiment of a mechanism for supporting a magnetic head of a flexible disk drive apparatus according to the present invention.

FIG. 1 shows a mechanism 1 for supporting a magnetic head according to one embodiment of the present invention. The magnetic head supporting mechanism 1 comprises a carriage 2 which is a member for moving a head in the radial direction of a magnetic disk (not shown) by an illustrated stepping motor, and a head arm 5 supporting the head and attached at one end thereof to a base 3 disposed at one end of the carriage 2 through a leaf spring 4. The magnetic head supporting mechanism 1 is guided and moved by a pair of guide rails 6 in the radial direction of the magnetic disk. The head arm 5 is biased by a coil spring 7 towards the carriage 2. A tab 8 is disposed on a side of the head arm 5 and contacts an unillustrated head load mechanism by which the head arm 5 can contact the magnetic disk through the tab 8 and be separated from the magnetic disk. A stopper 9 is disposed in the carriage 2 to restrict the movement of the head arm 5 on the carriage side. A first gimbal plate 10 has a small rigidity and is attached to the other end of a surface of the head arm 5 facing the magnetic disk and has degrees of freedom in the radial and circumferential directions of the magnetic disk and a direction perpendicular to the surfaces of the magnetic disk. A first magnetic head (not shown) is attached to the central portion of the first gimbal plate 10 so as to face one surface of the magnetic disk. An opening 11 is disposed in a portion of the head arm 5 to which the first gimbal plate 10 is attached. A flexible print cable 12 is attached at one end thereof to a surface of the first gimbal plate 10 opposite the surface thereof onto which the first magnetic head is attached. The one end of the flexible print cable 12 is electrically connected to a lead wire (not shown) extended from an unillustrated coil of the first magnetic head. The flexible print cable 12 is guided and fixed through the opening 11 to a surface of the head arm 5 opposite the surface thereof facing the magnetic disk. A gimbal support member 13 having a great rigidity for position adjustment is attached to the other end of the carriage 2 facing the magnetic disk. A second gimbal plate 14 has a small rigidity and is attached onto a surface of the gimbal support member 13 facing the magnetic disk and has a degree of freedom in the perpendicular direction with respect to the surfaces of the magnetic disk. A second magnetic head 15 is attached to the central portion of the second gimbal plate 14 so as to face one surface of the magnetic disk. Adhesives 27 and 30 for fixing the carriage 2 to the gimbal support member 13 are coated and filled in the clearance 2B between the side surfaces 2A and 13A for the carriage 2 and the gimbal support member 13.

Figure 2:
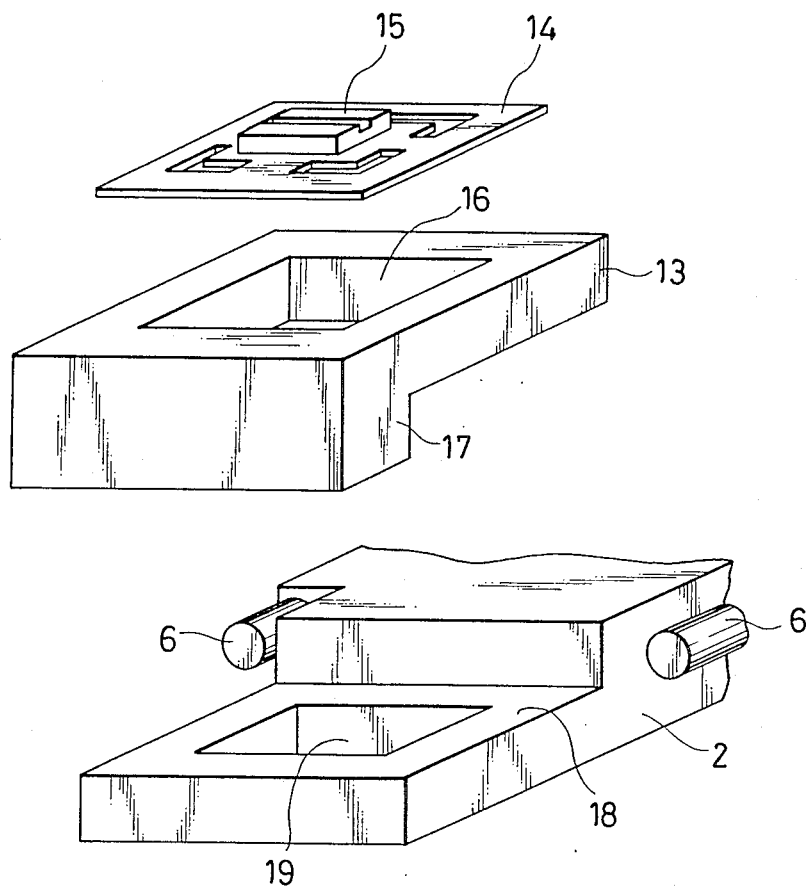
FIG. 2 is a disassembled view of the magnetic head assembly of the embodiment of FIG. 1.

FIG. 2 shows a perspective view showing a disassembled state of one end of the carriage 2. As shown in FIG. 2, the gimbal support member 13 is in the shape of a generally L with respect to the sides thereof and has an opening 16 in the central portion thereof and has a holding portion 17 having a thickness thicker than the other portion of the gimbal support member 13 so as to easily hold the position adjusting member 13 by a jig 20. The second gimbal plate 14 is attached onto the position adjusting member 13 so as to position the second magnetic head 15 attached onto the second gimbal plate 14 above the opening 16. A stepped portion 18, to which the gimbal support member 13 is attached, is disposed at an end of the surface of the carriage 2 facing the magnetic disk and has a height different from the ones of the other portions. The gimbal support member 13 is attached to the surface of the stepped portion 18 opposite the magnetic disk. An opening 19 is disposed in the central portion of the stepped portion 18. An unillustrated flexible print cable is attached at one end thereof onto the surface of the second gimbal plate 14 opposite the second magnetic head 15 attached onto the second gimbal plate 14. The one end of this flexible print cable is electrically connected to a lead wire (not shown) extended from an unillustrated coil of the second magnetic head. This flexible print cable is guided and fixed through the openings 16 and 19 to a surface of the carriage 2 opposite the surface thereof facing the magnetic disk.

FIG. 3 is a view for explaining the method for assembling the magnetic head support mechanism. In FIG. 3, the same portions of FIGS. 1 and 2 are designated by the same reference numerals thereof.

Rails 22 and 23 are accurately disposed in a carriage attaching base 21. A distance x shows a length from a reference surface 24 of the attaching base 21 to an unillustrated gap of a read/write core of the magnetic head 15. A distance y shows a length from the rail 22 to the gap. An angle $\theta$ shows an angle between the longitudinal direction of the rail 23 and the direction of the gap. A microscope 25 is disposed above a place in which the gap of the read/write core of the magnetic core 15 is positioned. The distance between the microscope 25 and the reference surface 24 and the distance between the microscope 25 and the rail 22 can be arbitrarily set.

The method for assembling the magnetic head support mechanism of the present embodiment will be now described with reference to FIGS. 2 and 3.

First, the magnetic head 15 is fixed to the gimbal plate 14. Next, this gimbal plate 14 is fixed by an adhesive to the gimbal support member 13. In this case, the positioning accuracy of the magnetic head 15 with respect to the gimbal plate 14 and the positioning accuracy of the gimbal plate 14 with respect to the gimbal support member 13 may be slightly rough. Next, the carriage 2 on which the gimbal support member 13 is not disposed is attached to the rails 22 and 23 of the attaching base 21 and is pressed onto the reference surface 24. At this time, the microscope 25 is disposed above a place in which the gap of the read/write core of the magnetic head 15 is positioned. Next, the gimbal support member 13 is held by the jig 20 and is disposed on the stepped portion 18 of the carriage 2. Then, an operator sets the gap of the read/write core of the magnetic head 15 to predetermined distances x and y and a predetermined angle θ while moving the jig 20 in the arrows A, B and C directions through the microscope 25. After the position adjustment, an adhesive 27 is coated between the side surface 13A of the gimbal support member 13 and the side surface 2A of the carriage 2, and the gimbal support member 13 is temporarily fixed to the carriage 2. After that, the jig 20 is removed from the gimbal support member 13, and the carriage 2 is removed from the attaching base 21. Then, an adhesive 30 is filled in the clearance 2B between the carriage 2 and the gimbal support member 13, thereby fixing the gimbal support member 13 to the carriage 2.

FIG. 4 shows another embodiment of such fixing method and a D—D sectional view of FIG. 3.

FIG. 4, an opening 19 of the carriage 2 is formed to be larger than an opening 16 of the gimbal support member 13. An extension portion 26 is disposed in the gimbal support member 13. After the gimbal support member 13 is temporarily fixed to the carriage 2 by an adhesive 27, the extension portion 26 is coated with an adhesive 28 in the direction of arrow E between the carriage 2 and the gimbal support member 13.

The attachment of the first magnetic head to the head arm 5, and the adjustment of the positions of the second magnetic head 15 and the first magnetic head are performed similar to the conventional methods.

In the present embodiment, the stepped portion 18 of the carriage 2 is in the shape of a frame having the opening 19 in the center thereof, but may have any shape which can support the gimbal support member 13 such as a shape in which a branched arm projects from an end of the carriage 2. The shapes of the gimbal support member 13, the first and second gimbal plates, etc. are not limited to the ones described in the above embodiment, but may be modified within the scope of the invention. Also, in the embodiment mentioned above, the stopper 9 is disposed in the carriage 2, but the present invention can be applied to a magnetic head supporting mechanism in which the stopper 9 is not disposed. Further, the gimbal support member 13 is directly attached to the carriage 2 in the above embodiment, but may be attached to a head support member which cannot substantially adjust the postion thereof with respect to the head moving member.

According to the present invention, as mentioned above, the second magnetic head is attached to the gimbal plate having a small rigidity, and the gimbal plate is then attached to the gimbal support member having a great rigidity, and the position of the second magnetic head with respect to the head moving member is adjusted by moving the gimbal support member. Accordingly, no external force is applied to the gimbal plate in adjusting the position of the second magnetic head so that the second magnetic head is exactly positioned and attached to the head moving member. Accordingly, the positioning accuracy of the magnetic head is improved and the recording density of the apparatus can be increased.

What is claimed is:

1. A method for assembling a magnetic head supporting mechanism of a flexible disk drive apparatus, said method comprising the steps of:
attaching a magnetic head means for recording and reproducing information to a gimbal support means with the magnetic head means in facing relation to a recording surface of a disk, through a first gimbal means for supporting the magnetic head means such that the entire peripheral portion of the first gimbal means is supported by the gimbal support means, said gimbal support means receiving a force when the position of said magnetic head means is adjusted;
arranging said gimbal support means in a first position in facing relation to a stepped portion of a head support means, said gimbal support means having an engaging portion engagable with a horizontal portion of the stepped portion of the head support means;
applying a force to said gimbal support means to move said gimbal support means relative to said head support means to position said magnetic head means in a predetermined position separated by a predetermined distance from a reference position of said head support means, said step of applying a force and moving said gimbal support means including engaging the engaging portion of the gimbal support means with the horizontal portion of the stepped portion of the head support means and moving said gimbal support means in the horizontal direction of the head support means; and
attaching said gimbal support means to said head support means.

2. An assembling method as claimed in claim 1, wherein said reference position of the head support means is set with respect to the longitudinal and widthwise directions of a base for attaching said magnetic head means thereto.

3. An assembling method as claimed in claim 1, wherein said gimbal support means is temporarily fixed to said head support means.

4. An assembling method as claimed in claim 3, wherein said gimbal support means is fixed to said head support means after the gimbal support means has been temporarily fixed to the head support means.

5. An assembling method as claimed in claim 3, wherein said gimbal support means is temporarily fixed to said head support means by an adhesive.

6. An assembling method as claimed in claim 1, wherein said gimbal support means has a generally L shape on the side thereof.

7. An assembling method as claimed in claim 1, wherein said head support means comprises a carriage of a one-side opening type.

8. A method for assembling a magnetic head supporting mechanism of a flexible disk drive apparatus comprising the steps of:
attaching a magnetic head means for recording and reproducing information to a first gimbal means for supporting the magnetic head means;
attaching said first gimbal means to a gimbal support means so that the entire peripheral portion of the first gimbal means is supported by gimbal support means;
placing said first gimbal means in a position in facing relation to a head support means;
applying a force to said gimbal support means so as to move said gimbal support means to position said magnetic head means in a predetermined position separated by a predetermined distance from a reference position of said head support means; and
attaching said gimbal support means to said head support means.

9. A method for assembling a magnetic head supporting mechanism of a flexible disk drive apparatus comprising the steps of:

attaching a magnetic head means for recording and reproducing information to a first gimbal means for supporting the magnetic head means;

attaching said first gimbal means to a gimbal support means so that the entire peripheral portion of the first gimbal means is supported by gimbal support means;

placing said gimbal support means in a position in facing relation to a head support means;

positioning said magnetic head means in a predetermined position separated by a predetermined distance from a reference position of said head support means by moving said gimbal support means relative to said head support means; and attaching said gimbal support means to said head support means.

* * * * *